United States Patent
Landernäs et al.

(10) Patent No.: US 11,706,659 B2
(45) Date of Patent: Jul. 18, 2023

(54) METHOD FOR OPERATING INTELLIGENT ELECTRONIC DEVICE AND AN INTELLIGENT ELECTRONIC DEVICE

(71) Applicant: ABB Schweiz AG, Baden (CH)

(72) Inventors: Krister Landernäs, Hallstahammar (SE); Morgan Johansson, Västerås (SE); Gargi Bag, Västerås (SE); Petri Hovila, Vaasa (FI)

(73) Assignee: ABB Schweiz AG, Baden (CH)

( * ) Notice: Subject to any disclaimer, the term of this patent is extended or adjusted under 35 U.S.C. 154(b) by 56 days.

(21) Appl. No.: 17/365,058

(22) Filed: Jul. 1, 2021

(65) Prior Publication Data
US 2022/0007228 A1  Jan. 6, 2022

(30) Foreign Application Priority Data

Jul. 6, 2020  (EP) .................................... 20184292

(51) Int. Cl.
*H04W 28/02* (2009.01)
*H04B 17/318* (2015.01)
(Continued)

(52) U.S. Cl.
CPC ...... *H04W 28/0268* (2013.01); *H04B 17/318* (2015.01); *H04B 17/364* (2015.01); *H04L 43/0852* (2013.01); *H04W 72/542* (2023.01)

(58) Field of Classification Search
CPC ............. H04W 28/02; H04W 28/0231; H04W 28/0236; H04W 28/0242; H04W 28/0247; H04W 28/0268; H04W 72/085; H04B 17/309; H04B 17/318; H04B 17/364; H04L 43/0852
See application file for complete search history.

(56) References Cited

U.S. PATENT DOCUMENTS

| | | |
|---|---|---|
| 2004/0138834 A1 | 7/2004 | Blackett et al. |
| 2008/0103631 A1 | 5/2008 | Koliwad et al. |

(Continued)

FOREIGN PATENT DOCUMENTS

| | | |
|---|---|---|
| EP | 2506379 A2 | 10/2012 |
| WO | 2019174889 A1 | 9/2019 |

OTHER PUBLICATIONS

Extended European Search Report; Application No. 20184292.9; dated Nov. 24, 2020; dated Dec. 2, 2020; 8 Pages.

*Primary Examiner* — Jenee Holland
(74) *Attorney, Agent, or Firm* — Whitmyer IP Group LLC

(57) ABSTRACT

A method of operating an intelligent electronic device that is in a wireless communication with a base station of a wireless communication system is described. The method includes monitoring at least two QoS parameters of the wireless communication and controlling the operation of the intelligent electronic device based on the at least two QoS parameters, wherein the intelligent electronic device includes a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device over an interface.

18 Claims, 2 Drawing Sheets

(51) Int. Cl.
H04B 17/364 (2015.01)
H04L 43/0852 (2022.01)
H04W 72/542 (2023.01)

(56) References Cited

U.S. PATENT DOCUMENTS

| | | | | |
|---|---|---|---|---|
| 2010/0290442 | A1* | 11/2010 | Souissi | H04W 88/04 |
| | | | | 370/338 |
| 2012/0249286 | A1* | 10/2012 | Bush | H02J 13/00034 |
| | | | | 340/3.43 |
| 2014/0277801 | A1* | 9/2014 | Cioraca | H04W 12/069 |
| | | | | 700/292 |
| 2015/0229516 | A1* | 8/2015 | Thanos | H04L 41/0809 |
| | | | | 370/254 |
| 2016/0239078 | A1* | 8/2016 | Karandikar | G06F 1/10 |
| 2017/0344047 | A1* | 11/2017 | Cioraca | G05F 1/70 |
| 2019/0041531 | A1* | 2/2019 | Schmotzer | G08G 1/0969 |
| 2021/0022021 | A1* | 1/2021 | Bag | H04W 52/241 |
| 2021/0099369 | A1* | 4/2021 | Huang | H04L 41/0806 |
| 2021/0242928 | A1* | 8/2021 | Park | H04B 17/318 |

* cited by examiner

METHOD FOR OPERATING INTELLIGENT ELECTRONIC DEVICE AND AN INTELLIGENT ELECTRONIC DEVICE

TECHNICAL FIELD

Embodiments of the present disclosure relate to an intelligent electronic device, in particular for use in electric utility automation applications, such as in substation automation or distribution automation systems. According to embodiments, the intelligent electronic device is in a wireless communication with a base station of a wireless communication system. Specifically, embodiments relate to a method of operating an intelligent electronic device, an intelligent electronic device configured for performing a method of operating the intelligent electronic device, and a computer-readable storage medium having instructions to perform a method of operating an intelligent electronic device.

BACKGROUND

Intelligent electronic devices (IEDs) are commonly used in electric utility automation applications, such as in substation automation or distribution automation systems. IEDs typically include valuable information, both operational and non-operational, needed by different user groups within the utility. An IED is typically any device that incorporates one or more processors with the capability to receive or send data/control from or to an external source (e.g., electronic multifunction meters, digital relays, controllers). IED technology typically support improvements in reliability, operational efficiencies, and asset management programs including predictive maintenance, life extensions and improved planning.

IEDs typically facilitate the exchange of both operational and non-operational data. Operational data, also called supervisory control and data acquisition (SCADA) data, include instantaneous values of power system analogue and status points such as volts, amps, MW, MVAR, circuit breaker status, switch position. This data is typically time critical and is used to monitor and control the power system (e.g., opening circuit breakers, changing tap settings, equipment failure indication, etc.). Non-operational data typically include files and waveforms such as event summaries, oscillographic event reports, or sequential events records, in addition to SCADA-like points (e.g., status and analogue points) that have a logical state or a numerical value. This data is typically not needed by the SCADA dispatchers to monitor and control the power system.

Local process equipment in substation automation or distribution automation systems, such as circuit breakers and transformers, are typically controlled and/or protected by IEDs. These intelligent electronic devices in many cases communicate with each other, higher control and protection level devices and SCADA systems through a communication infrastructure.

IEDs such as protection devices, relays, phasor measurement units (PMUs), are often designed to communicate not only to SCADA systems but also share information between each other. The communication can run over dedicated networks (e.g. fibre networks) or use cellular solutions like 5G. Such communication is important to the operation of the power grid.

Accordingly, the ability to handle communication outages is important. Communication outages can occur for reasons such as power outage. In some of these cases, the affected equipment will still be able to communicate, at least for some time. For example, a power outage in a 5G base station can cause the possibility to communicate with that base station or perform edge computation using that base station to be lost.

Typically, the base station will have an uninterruptible power supply (UPS) system to provide emergency power for a limited time. But after this time has elapsed, the IEDs in the power grid will need to operate with no support from the base station. Therefore, there is a problem of IEDs faced with a communication outage.

SUMMARY

In light of the above, a method for operating an intelligent electronic device, an intelligent electronic device, and a computer-readable storage medium according to the independent claims are provided. Further aspects, advantages and features of the present disclosure are apparent from the description and the accompanying drawings.

According to one aspect, there is provided a method for operating an intelligent electronic device that is in a wireless communication with a base station of a wireless communication system. The method includes monitoring at least two QoS parameters of the wireless communication and controlling the operation of the intelligent electronic device based on the at least two QoS parameters, wherein the intelligent electronic device includes a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device over an interface.

According to one aspect, there is provided an intelligent electronic device configured for a wireless communication with a base station of a wireless communication system. The intelligent electronic device includes a microprocessor and program memory including computer code enabling the intelligent electronic device to perform a method for operating the intelligent electronic device including monitoring at least two QoS parameters of the wireless communication and controlling the operation of the intelligent electronic device based on the at least two QoS parameters, wherein the intelligent electronic device includes a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device over an interface.

According to one aspect, there is provided computer-readable storage medium including instructions which, when executed, cause an intelligent electronic device to perform a method for operating the intelligent electronic device including monitoring at least two QoS parameters of the wireless communication and controlling the operation of the intelligent electronic device based on the at least two QoS parameters, wherein the intelligent electronic device includes a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device over an interface.

BRIEF DESCRIPTION OF THE DRAWINGS

So that the manner in which the above recited features of the present disclosure can be understood in more detail, a more particular description of the disclosure, briefly summarized above, may be had by reference to the accompanying drawings which are briefly described as follows.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations. Within the following description of the figures, the same reference numbers refer to the same or to similar components.

Figure 1:
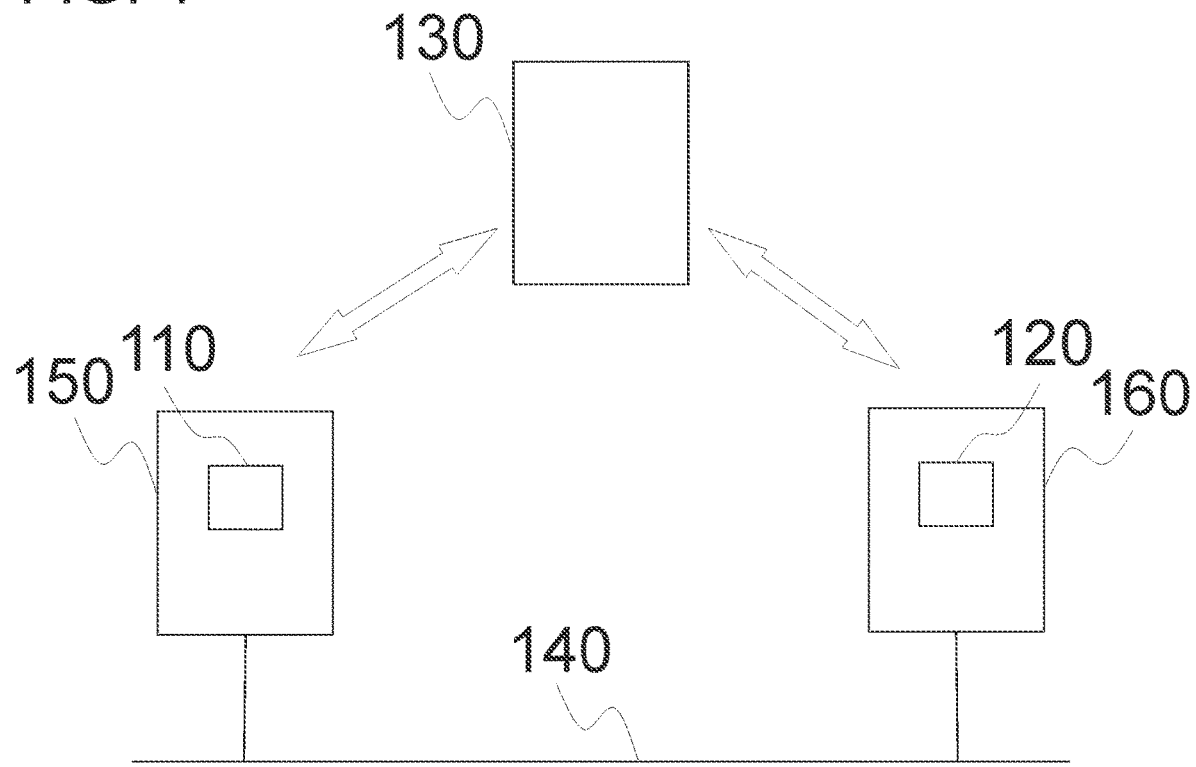
FIG. 1 shows a schematic drawing illustrating an environment in which embodiments of the present disclosure can be applied.

FIG. 1 is a schematic illustration of an environment in which embodiments described herein can be applied. A power transmission line 140 may be used to transfer AC power in an electric grid. Along the power transmission line 140, a first substation 150 and a second substation 160 are provided. The first substation 150 and second substation 160 may be electrical substations for managing electrical power transfer over the power transmission line 140.

At the substations 150, 160, a respective intelligent electronic device (IED) 110, 120 is provided. The IEDs are configured for an electric utility automation application, such as a control/protection function of a substation automation. For this purpose, the IED obtains operational and/or non-operational data from the substation and perform an analysis based thereon.

The IEDs 110, 120 further communicate through a communication infrastructure. Here, the communication infrastructure includes a wireless communication system (e.g., a cellular network, represented in FIG. 1 by double arrows) having a base station 130. The base station 130 provides a wireless network for the first substation 150 and second substation 160 and allows them to communicate through the wireless network. The setup of FIG. 1 illustrates that an IED is used in an electric utility automation and is configured to communicate over a wireless network.

Figure 2:
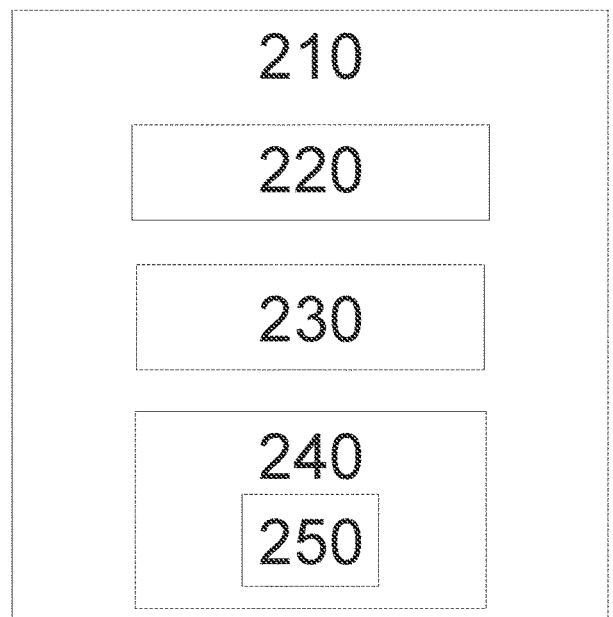
FIG. 2 shows a schematic diagram illustrating components of an intelligent electronic device according to embodiments of the present disclosure.

FIG. 2 is a schematic diagram illustrating components of an embodiment of an intelligent electronic device 210 which can be used in such a setup as illustrated in FIG. 1 (e.g., used as IED 110, 120), or in an analogous setup. The intelligent electronic device 210 of FIG. 2 has a wireless communication module 220 for performing wireless communication with a base station of a wireless communication system (e.g., base station 130 of FIG. 1). The wireless communication module 220 is configured for monitoring QoS parameters of the wireless communication. The intelligent electronic device 210 further has a microprocessor 230 and a program memory 240 having computer code 250 enabling the intelligent electronic device to perform a method as described herein. The microprocessor 230 and a program memory 240 having computer code 250 are also referred to as the IED's control module.

Figure 3:
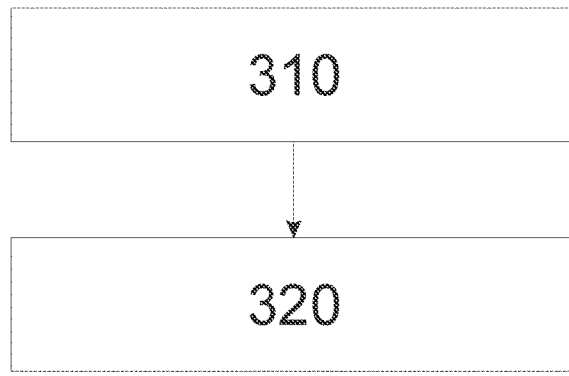
FIG. 3 shows a flow chart illustrating a method for operating an intelligent electronic device according to embodiments of the present disclosure.

FIG. 3 is a flow chart illustrating a method for operating an intelligent electronic device according to embodiments described herein. According to embodiments described herein, a method for operating an intelligent electronic device which is in wireless communication with a base station of a wireless communication system is provided. The method may include monitoring at least two QoS parameters of the wireless communication 310.

An aspect of the invention is the interaction of the wireless communication module 220 with the IED's control module performing the electric utility automation application, and specifically the fact that the IED uses the monitored QoS parameters of the wireless communication module 220 for controlling the (electric utility automation application) operation. This interaction is described in further detail below.

Figure 4:
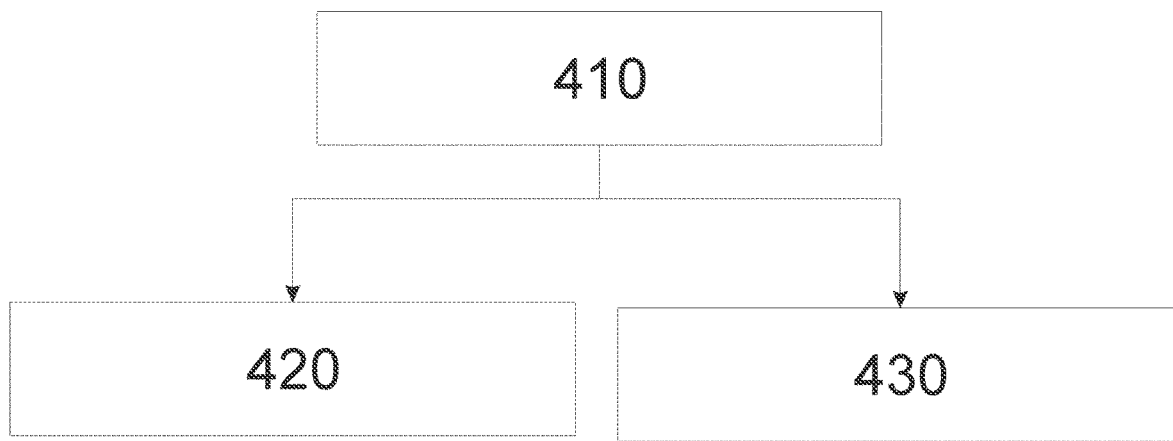
FIG. 4 shows a flow chart illustrating a method for operating an intelligent electronic device according to embodiments of the present disclosure.

An example of this interaction is shown in FIG. 4 illustrating a method for operating an intelligent electronic device. Based on at least two QoS parameters, the intelligent electronic device may be brought to a fail-safe mode 430.

Figure 5:
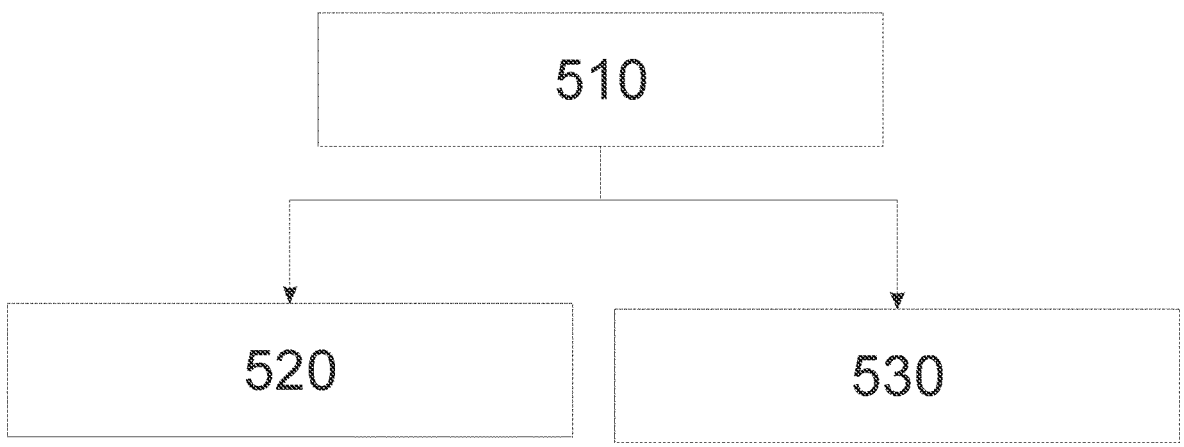
FIG. 5 shows a flow chart illustrating a method for operating an intelligent electronic device according to embodiments of the present disclosure.

FIG. 5 illustrates a method for operating an intelligent electronic device. Therein, based on the at least two QoS parameters, the method may further include restoring the intelligent electronic device to a normal operation mode 530.

At least one of the following advantages is realised by the aspects and embodiments described herein. An intelligent electronic device (IED) is able to monitor a wireless communication with a base station, to determine if the IED is experiencing a communication outage (e.g., a loss or reduction of communication capabilities over the wireless network). A communication outage may, for example, be caused by interference in the wireless communication, too many devices trying to communicate, power outage at the base station, equipment failure at the base station, or software issues in the base station. Based upon the monitoring, the IED is able to control the operation of the IED appropriately, e.g. alerting a SCADA system, operate the IED in a fail-safe mode, restore normal operation of the IED. Accordingly, mitigation action may be initiated in case of an imminent communication outage. Similarly, the impact of a communication outage on the IED may be reduced. In this way, communication outage in smart grids can be handled and IEDs resilient to communication outage can be provided.

Next, further aspects and details of the invention are described. Each of these aspects is not limited to any particular embodiment, but is optional and can be combined with any other aspect(s) or embodiment(s) described herein unless specified otherwise. The reference numbers used in the following are merely for illustration.

Use of the IEDs

In the following, aspects relating to the use of the IEDs for electric utility automation applications are described.

According to an aspect, the IED may be configured for an electric utility automation applications, such as an automation (e.g., control and/or protection function) of an electric utility such as a substation or distribution system, specifically of a local process equipment of the electric utility, such as a circuit breaker or a transformer or the like.

The electric utility may comprise a power transmission line 140 to transfer (e.g., AC) power in an electric grid. The power transmission line 140 may transfer power in either direction. The power transmission line 140 may include separate cables for separate phases, e.g. three phases. The transmission may be a medium voltage (MV) transmission. For the purposes of the present disclosure, medium voltage (MV) relates to voltages higher than 1 kV AC and lower than 72 kV AC.

The electric utility may comprise a at least one substation (e.g., a first substation 150 and a second substation 160). The substation may be an electrical substation for managing electrical power transfer over the power transmission line 140. The substation may include components for power conversion and/or power distribution, and/or equipment to obtain electric measurements of the substation components and/or of the power transmission line 140.

According to embodiments described herein, an intelligent electronic device (IED) is provided. The intelligent electronic device (IED) may be configured (used) for an electric utility automation applications, such as an automation (e.g., control and/or protection function) of a substation or distribution system. The intelligent electronic device (IED) may be provided in a substation, for example the first substation 150, for substation automation. In the examples herein, a substation is typically given for the sake of illustration, but the IED may likewise also be operated in another electric utility automation scenario, for example arranged along a transmission line for transmission line supervision. A plurality of intelligent electronic devices may be provided, for example a first intelligent electronic device 110 and a second intelligent electronic device 120.

In the example shown in FIG. 1, two intelligent electronic devices (IEDs) are shown, a first intelligent electronic device 110 in a first substation 150 and a second intelligent electronic device 120 in a second substation 160. The first intelligent electronic device 110 may be for controlling and/or protecting power system equipment in the first substation 150. The second intelligent electronic device 120 may be for controlling and/or protecting power system equipment in the second substation 160.

Embodiments of the intelligent electronic device are shown in FIG. 1 (first intelligent electronic device 110 and second intelligent electronic device 120), in FIG. 2 (intelligent electronic device 210), and embodiments of a method for operating the intelligent electronic device are shown in FIG. 3 to FIG. 5. The embodiments are not exclusive of each other and are intended to be combined as appropriate.

An IED may be configured for at least one of the following (partially overlapping) list: protective relay automation, recloser/breaker automation, phasor measurement unit (PMU), a tap changer controller, a circuit breaker controller, a capacitor bank switch, a recloser controller, and a voltage regulator. In some embodiments, a plurality of functions (such as a subset of the list above) may be included in a single intelligent electronic device.

More substations and intelligent electronic devices than those shown in the figures, for example FIG. 1, can be provided. The embodiments described herein may be applied, differently or uniformly, where appropriate, to a intelligent electronic device of a plurality of intelligent electronic devices.

In an example, by communicating the phasors between a first substation 150 a second substation 160 arranged along a power transmission line 140 and comparing the phasors, faults can be detected. For fault detection, line differential analysis can be performed. This analysis can be performed in respective relays of the first substation 150 and second substation 160. In order to react quickly to any issues detected using the line differential analysis, latency of communication should be very low and reliability should be high.

The IED 110, 120 may thus receive or generate operational and/or non-operational data (e.g., electric measurements, the results of analysis based thereon) for the substation automation. The electric measurements may relate to voltage and/or current, and may be expressed as a phasor.

According to embodiments, a method of operating an intelligent electronic device may include monitoring and/or controlling, by the intelligent electronic device, a functional element of a power grid. According to embodiments, an intelligent electronic device may be configured to monitor and/or control a functional element of a power grid. The monitoring and/or controlling of the functional element of the power grid includes the monitoring and/or controlling of at least one of the following: instantaneous values of power system analogue and status points such as volts, amps, MW, MVAR, circuit breaker status, switch position.

Wireless Communication Network

Next, aspects relating to the wireless communication network are described. The IED may communicate such operational and/or non-operational data with other IEDs, with higher control and protection level devices, and/or a supervisory control and data acquisition (SCADA) system through a communication infrastructure.

According to embodiments described herein, an intelligent electronic device is configured for a wireless communication with a base station of a wireless communication system. A base station 130 of a cellular network may provide cellular network coverage for the IED(s). While one base station 130 was shown in the example of FIG. 1, multiple base stations 130 may be deployed to provide sufficient coverage.

The base station 130, possibly together with other base stations, form part of a Radio Access Network (RAN). A wireless communication system may include a radio access network (RAN). A wireless communication system may be understood as a mobile telecommunication system.

According to embodiments, the first intelligent electronic device 110 can send uplink communication to the base station 130 and receive downlink communication from the base station 130. Analogously, the second intelligent electronic device 120 can send uplink communication to the base station 130 and receive downlink communication from the base station 130. In other words, uplink communication can occur from an intelligent electronic device to the base station 130 and downlink communication can occur from the base station 130 to an intelligent electronic device. Data may be transmitted between the base station and an intelligent electronic device in IP (Internet Protocol) packets.

According to embodiments, the first intelligent electronic device 110 (and/or any other IED described herein such as the second intelligent electronic device 120) can be connected to the base station 130 by a (digital, mobile) long-distance telecommunications network such as a globally connected telecommunications network such as for example a 5G network.

In close proximity to the base station 130 (e.g., connected through a local low-latency connection, as opposed to the long-distance telecommunications network), there may be arranged an edge computing device (not shown). By providing the edge computing device by the base station 130, rather than in a central location for the whole network, latency is significantly reduced. Moreover, bandwidth use or requirement of the network communication is reduced. The edge computing device may utilise what is called multi-access edge computing (MEC). MEC is a cloud computing capability at the edge of the RAN that offers storage and computational resources at the edge, for running low latency applications.

An edge computing device (not shown) may be used for any number of applications, such as load prediction, volt-var control (VVC), or detection of communication errors between intelligent electronic devices such as the first intelligent electronic device 110 and the second intelligent electronic device 120.

According to some embodiments, errors can be detected in a stack, e.g. at the network layer, data link layer, physical layer, by the wireless communication module of an intelligent electronic device.

Distributed and edge computing has a number of advantages such as scalability, redundancy, reduced computational burden at a centralized processor, and improved latency.

According to embodiments, wireless communication between the intelligent electronic device and the base station enables error detection to be performed. The error detection may for example be performed by edge computation using the base station or may additionally or alternatively be performed using other parts of the wireless communication module, radio module and/or the base station.

According to embodiments, a method for operating an intelligent electronic device may include communicating by wireless communication with a base station 130, for example for sending to and/or receiving information from another entity, e.g. other intelligent electronic devices, higher control and protection level devices, and/or a SCADA system.

The method may include adapting a monitoring of a functional element of a power grid and/or adapting a control of a functional element of a power grid based on the information sent to and/or received from other intelligent electronic devices. Where one functional element is indicated, it may, where appropriate refer to a plurality of functional elements. This may be according to the function(s) of the intelligent electronic device.

Wireless Communication Module, Other Hardware of IED

The intelligent electronic device 210 may have a wireless communication module 220 for performing wireless communication with a base station 130 of a wireless communication system. The intelligent electronic device 210 may have a microprocessor 230 and a program memory 240 having computer code 250. The intelligent electronic device 210 may include computer code enabling the intelligent electronic device 210 to perform a method of operating the intelligent electronic device according to embodiments herein.

In the specific example shown in FIG. 2, the intelligent electronic device 210 includes a wireless communication module 220, a microprocessor 230 and a program memory 240 having computer code 250 enabling the intelligent electronic device 210 to perform a method according to embodiments described herein.

The intelligent electronic device 210 includes a control module. According to embodiments, the control module is implemented by microprocessor 230 and program memory 240 having computer code 250. For example, computer code 250 stored on program memory 240 may include the control module.

According to embodiments, the intelligent electronic device 210 includes computer code or software enabling the transfer of operating parameters of the wireless communication module 220 via an interface to the control module of the intelligent electronic device. For example, the operating parameters includes at least two (monitored) QoS parameters of the wireless communication between the wireless communication module 220 and the base station 130 of a wireless communication system.

A wireless communication module 220 may be, for example, a cellular radio module having hardware and software to allow the intelligent electronic device 210 to act as a cellular communication terminal, also known as User Equipment (UE), for communication with the base station 130 using a cellular communication network. The wireless communication module 220 may include an integrated circuit chip separate from the processor and communicating with the processor over an interface such as a bus or other connection on a printed circuit board.

The cellular communication network can e.g. comply with any one or a combination of LTE (Long Term Evolution), next generation mobile networks (fifth generation, 5G), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable.

Health Status/QoS Parameter

The base station 130 may have the option of signalling at least one status variable to an intelligent electronic device. A status variable may be information of an operational status of the base station. A status variable may represent an operational status of the base station.

An operational status of the base station 130 may include at least one of the following: a power status of the base station, a health status of at least one internal system of the base station, and a health status of the base station.

A health status may include number of lost transmissions, uptime, and/or number of lost connections. Health status may be a metric calculated (among others) from at least one of these data.

According to embodiments, the method may include receiving a power status of a base station 130. A power status of the base station may include information that the base station is on normal electric power or is supplied by an uninterruptable power supply (UPS). Accordingly, an intelligent electronic device may receive and/or be configured to receive at least one status variable of a base station, preferably including the base station's power status. The power status may then be used as a QoS parameter by the intelligent electronic device.

A QoS parameter may be understood as a Quality of Service parameter. A QoS parameter may be of the wireless communication, e.g. between the wireless communication module 220 and the base station 130.

The method of monitoring at least two QoS parameters of the wireless communication 310 may be performed by the wireless communication module 220. Alternatively or in addition, the processor 230 may monitor at least two QoS parameters 310.

QoS parameters may include at least one of the following: a signal strength or received signal strength indicator (RSSI) parameter, a latency parameter, a packet loss parameter, a network load parameter. The QoS parameter(s) may further include the health status of the base station. Other QoS parameters may also be monitored. In a particular example, the QoS parameters include at least a signal strength or received signal strength indicator (RSSI), and a packet loss parameter.

A QoS parameter may be determined in a base station 130 and the intelligent electronic device may receive the at least two QoS parameters from the base station 130. Alternatively or in addition, a QoS parameter may be determined in the wireless communication module 220 of the intelligent electronic device 210.

Accordingly, at least two QoS parameters of the wireless communication may be determined in at least one or both of the base station 130 and the wireless communication module 220. In other words, QoS parameters may be determined in the wireless communication module 220 of the intelligent electronic device 210, in the base station 130 and received from the base station 130, or both.

In this manner, an availability or non-availability (or degree of availability) of the wireless communication may be determined. For example, a first QoS parameter representing a high signal strength and a second QoS parameter representing a high packet loss can indicate interference. In another example, a first QoS parameter representing high network load and a second QoS parameter representing high latency can indicate too many devices trying to communicate. Accordingly, the availability or non-availability of the wireless communication may be determined.

A communication outage may be understood as a non-availability or severe reduction of the wireless communication. Causes of a communication outage may be communication related, e.g. interference or too many devices trying to communicate. Causes of a communication outage may be related to the base station, for example software issues, equipment failure or power outage.

According to an example, which may be combined with other examples described herein, monitoring at least two QoS parameters of the wireless communication 310 includes one or more of the following: monitoring the at least two QoS parameters to determine a likelihood or probability of a communication outage, e.g. with the base station; monitoring the at least two QoS parameters to determine a likelihood or probability of an interference in the wireless communication, e.g. with the base station; monitoring the at least two QoS parameters to determine a likelihood or probability of too many devices trying to communicate, e.g. with the base station; monitoring the at least two QoS parameters to determine a likelihood or probability of a power outage at the base station; monitoring the at least two QoS parameters to determine a likelihood or probability of an equipment failure at the base station; monitoring the at least two QoS parameters to determine a likelihood or probability of a software issue in the base station.

Control of Operation Based on the QoS Parameters

The method may include controlling an operation of the intelligent electronic device based on the at least two QoS parameters 320. Control of the operation of the intelligent electronic device may include at least one of the following: modifying a protection method employed in the intelligent electronic device, modifying a communication method between the intelligent electronic device and a base station, and modifying a control method in the intelligent electronic device. Other operations of the intelligent electronic device may be controlled.

The method of controlling an operation of the intelligent electronic device based on the at least two QoS parameters 320 may be performed by the intelligent electronic device 210. In an example, controlling an operation of the intelligent electronic device 320 may be performed by the control module.

In an example, modifying a protection method employed in the intelligent electronic device includes configuring the protection method which includes a first signal from a first entity as input, to omit said first signal as input in said protection method.

The first entity may be remote from the intelligent electronic device. The first entity may be a second intelligent electronic device, another control/protection device, or a SCADA system. The first signal may represent a parameter of a functional element of a power grid. The first signal may be a monitored quantity such as breaker status, switch status, voltage or current.

In an example, modifying a protection method employed in the intelligent electronic device includes adjusting a first protection threshold from a first value to a second value, the second value being more conservative than the first value.

The protection threshold may be a pre-configured safe limit of a monitored quantity. The protection threshold may of a functional element of a power grid. In an example, the protection threshold is a functional element of the power grid controlled and/or protected by the intelligent electronic device.

In an example, modifying a control method employed in the intelligent electronic device includes adapting the control method having a first control logic which includes a first signal from a first entity, to omit said first signal as input in said control method. Optionally, the first signal can be replaced by a default first signal as input. The first control logic may be implemented by the control module of the intelligent electronic device.

In an example, modifying a control method employed in the intelligent electronic device includes deactivating a first control logic and activating a second control logic. The first control logic may have the same control functionality or control function as the second control logic. In an example, the first control logic and the second control logic represent alternative control method employed by the intelligent electronic device.

The first control logic may be a coordinated control logic. The first control logic may be dependent on at least one other intelligent electronic device control logic. The first control logic may include at least one other device only accessible to the intelligent electronic device via the wireless communication system as a source of an input signal and/or as a target for an output signal. In an example, the first control logic is dependent on at least one other intelligent electronic device.

The second control logic may be an independent control logic. The second control logic may be independent of any other intelligent electronic device control logic. The second control logic may exclude any device accessible to the intelligent electronic device only via the wireless communication system as a source of an input signal or as a target for an output signal. In an example, the second control logic implements a control method that is independent of other entities such as higher control/protection devices, and/or a SCADA system.

In an example, modifying a communication method employed in the intelligent electronic device includes changing the coding method e.g. forward error correction method, changing the transmission frequency, changing the modulation, and/or changing the antenna setup e.g. beamforming configuration.

A control module may implement at least one of protection method, control method and communication method. The following example relating to a control method of the control module may appropriately apply to a protection method and/or a communication method of the control module.

A control module may implement at least a control method including at least one control logic such as the first control logic and the second control logic described herein. The control logic may be stored on the program memory 240 and implemented by the microprocessor 230 of the intelligent electronic device 210. The control logic may be stored as instructions on a computer-readable storage medium. In an example, a control logic may be computer code on a program memory of the intelligent electronic device.

A control module is a component of the intelligent electronic device for performing a control/protection function of the intelligent electronic device. For example, the control module of the intelligent electronic device may be understood as a controller for controlling/protecting at least one power system equipment.

The control module may be configured to send control/protection signals to a power system equipment, e.g. via a process bus. Examples of a control module may include station controller, bay controller and relay controller.

In the example shown in FIG. 3, the method includes monitoring at least two QoS parameters of the wireless communication 310 and controlling an operation of the intelligent electronic device, such as described above, based on the at least two QoS parameters 320, wherein the intelligent electronic device includes a wireless communication module, and wherein wireless communication is carried out between the wireless communication module 220 and the base station 130 of the wireless communication system, and wherein the. QoS parameters are determined at least in part in the wireless communication module and are transferred to a control module of the intelligent electronic device over an interface.

Accordingly, the method includes using the monitored QoS parameters of the wireless communication module 220 for controlling the (electric utility automation application) operation of the intelligent electronic device.

According to an aspect, at least one of the following control functions of the intelligent electronic device may be based on the monitored QoS parameters (i.e., selected or substantially modified by explicitly taking into account the QoS parameters): Carrying out the electric utility automation application, such as the control/protection of the electric utility (e.g., substation, and/or distribution system); control of local process equipment in the substation automation or distribution automation systems, such as a circuit breaker and transformer.

Fail-Safe Mode, Normal Mode

Next, aspects relating to the operation of the intelligent electronic device in a fail-safe mode and in a normal mode are described. As discussed above and illustrated in FIGS. 4 and 5, according to an aspect, the intelligent electronic device may be brought to a fail-safe mode 430 based on at least two QoS parameters. Thus, in this aspect, the method may include monitoring at least two QoS parameters 410, controlling the operation of the intelligent electronic device based on the QoS parameters 420, wherein the controlling comprises operating the intelligent electronic device in a fail-safe mode 430.

According to a further aspect, the operation of the intelligent electronic device may be restored to a normal operation mode 530 based on at least two QoS parameters. Both aspects include selecting, by the controller of the IED, the operation mode using the at least QoS parameters as an input. Thus, in this aspect, the method may include monitoring at least two QoS parameters 510, controlling the operation of the intelligent electronic device based on the QoS parameters 520, and restoring the intelligent electronic device to a normal operation mode 530.

The method of operating the intelligent electronic device in a fail-safe mode 430 may include at least one of the following: operating the intelligent electronic device in a low-power mode, decreasing communication to the base station and storing information e.g. for sending to the base station once wireless communication is fully operational again, rolling back ongoing software updates, rejecting new software updates, and alerting a SCADA system of a change in operation mode e.g. to allow local control or an increased level of local control.

A local control may be understood as a control method (e.g. control scheme, control algorithm, e.g. of the intelligent electronic device, e.g. by a control module of the intelligent electronic device) that does not rely on inputs received via the wireless communication module of the intelligent electronic device. For example, a local control may be a control method that requires only locally stored information. In another example, a local control may be a control method that can be executed while wireless communication with the base station is offline.

When the at least two QoS parameters indicate a possibility of a communication outage, the intelligent electronic device may send an alarm or alert to a SCADA system. Accordingly, an alarm or alert may be sent to a SCADA system prior to a communication outage.

According to an example, which may be combined with other examples described herein, controlling the operation of the intelligent electronic device based on the at least two QoS parameters 320 includes one or more of the following: operating the intelligent electronic device in a fail-safe mode; operating the intelligent electronic device in a low-power mode; decreasing communication to the base station; storing information locally; storing information intended for the base station, e.g. without sending the information to the base station; storing information for sending to the base station at a later time, e.g. when wireless communication is fully operational or when an end of a state of communication outage is determined; increasing a level of a local control, e.g. of the intelligent electronic device; rolling back ongoing software updates; rejecting new software updates; sending an alarm or alert to a SCADA system, e.g. for informing the SCADA system of a likelihood or probability as described in examples herein; alerting a SCADA system of a change in operation mode of the intelligent electronic device; decreasing or ceasing an automatic control by a SCADA system.

Advantages of operating the intelligent electronic device in fail-safe mode such as in low power mode, decreasing communication and storing information locally, and local control or increased level of local control include at least one of the following: operational time can be extended, shutdown can be delayed, load on the communication network can be reduced which is particularly useful if load on the communication network is the root problem.

A power outage affecting the base station 130 is likely to be not isolated to the base station and therefore likely to affect the locality in which the intelligent electronic device is in. Accordingly, operating the intelligent electronic device in low-power mode is beneficial.

The intelligent electronic device may be configured to be operated in a fail-safe mode based on the at least two QoS parameters. For example, the intelligent electronic device may include a program memory having computer code enabling the intelligent electronic device to perform the method of operating the intelligent electronic device in a fail-safe mode 430.

The fail-safe mode may, additionally or alternatively, include a low-communication mode in which the communication to the base station is decreased but not completely stopped. For example, the information for sending to the base station and/or for receiving from the base station may be assigned a respective priority status (e.g., identifying high-priority information and low-priority information). This information may, in particular, include the input signal(s) and/or output signal(s); in this case the input signal(s) and/or output signal(s) are assigned a respective priority status. The low-communication mode may then include sending and/or receiving, by the wireless communication module, only transmitting (sending and/or receiving) information of a selected priority status (e.g., high priority status or priority status above a defined threshold). The non-transmitted information may optionally be temporarily stored in a queue and be transmitted after restoration to a normal mode.

According to an example, which may be combined with other examples described herein, monitoring at least two QoS parameters of the wireless communication 310 includes one or more of the following, for determining a state of communication outage 510 or an end of a state of communication outage: monitoring the QoS parameters during an abnormal condition; monitoring the QoS parameters when the intelligent electronic device is in a fail-safe mode; monitoring the QoS parameters when the intelligent electronic device is in a low-power mode; monitoring the QoS parameters when the intelligent electronic device is in a mode of decreased communication to the base station; monitoring the QoS parameters when the intelligent electronic device is in a mode of storing information locally; monitoring the QoS parameters when the intelligent electronic device is in a mode of storing information intended for to be sent to the base station; monitoring the QoS parameters when the intelligent electronic device is in a mode of storing information for sending to the base station at a later time; monitoring the QoS parameters when the intelligent electronic device is in a mode of storing information for sending to the base station when wireless communication is fully operational; monitoring the QoS parameters when the intelligent electronic device is in a mode of an increased level of local control; monitoring the QoS parameters when the intelligent electronic device is rolling back ongoing software updates; monitoring the QoS parameters when the intelligent electronic device is in a mode of rejecting new software updates; monitoring the QoS parameters when the intelligent electronic device has sent an alarm or alert to a SCADA system; monitoring the QoS parameters when the intelligent electronic device has alerted a SCADA system of a change in operation mode of the intelligent electronic device.

The method of restoring the intelligent electronic device to a normal operation mode 530 may include at least one of the following: restoring the intelligent electronic device to a normal-power mode from a low-power mode, synchronizing information locally stored during a fail-safe mode e.g. sending said information to the base station or to another device via the base station, resuming software updates or returning to a state of allowing software updates, and informing a SCADA system of a return to normal operation mode e.g. to allow a resumption of an automatic control.

The method of restoring the intelligent electronic device to a normal operation mode 530 may include monitoring the QoS parameters during an abnormal condition, e.g. fail-safe mode, and once the wireless communication is fully operational again and full connectivity is restored e.g. full connectivity with the base station is restored, the intelligent electronic device initiates at least one of the following to restore normal operation: go to normal operation mode, synchronize information that was locally stored, allow software updates, inform SCADA system of change in operation mode.

Additionally or alternative, the intelligent electronic device initiates one of the following: restoring the intelligent electronic device to a normal-power mode from a low-power mode, synchronizing information locally stored during a fail-safe mode e.g. sending said information to the base station or to another device via the base station, resuming software updates or returning to a state of allowing software updates, and informing a SCADA system of a return to normal operation mode e.g. to allow a resumption of an automatic control.

The intelligent electronic device may be configured to be restored to a normal operation mode e.g. from a fail-safe mode based on the at least two QoS parameters. For example, the intelligent electronic device may include a program memory having computer code enabling the intelligent electronic device to perform the method of restoring the intelligent electronic device to a normal operation mode 530 e.g. from a fail-safe mode.

According to an example, which may be combined with other examples described herein, when an end of a state of communication outage is determined, controlling the operation of the intelligent electronic device 320 includes one or more of the following: restoring the intelligent electronic device to a normal operation mode; restoring the intelligent electronic device from a low-power mode; restoring the intelligent electronic device to a normal-power mode; increasing or restoring communication to the base station; ceasing storing information locally; synchronizing with or sending to the base station, locally stored information intended for the base station; sending to the base station, information for the base station which was stored at an earlier time; decreasing a level of a local control, e.g. of the intelligent electronic device; resuming or restarting software updates; allowing new software updates; sending an alarm or alert to a SCADA system, e.g. for informing the SCADA system of an end of communication outage; alerting a SCADA system of a change in operation mode of the intelligent electronic device; increasing or restoring an automatic control by a SCADA system.

Software

The intelligent electronic device may include computer code enabling the intelligent electronic device to send information to and/or receive information from other entities, e.g. other intelligent electronic devices, using a wireless communication module of the intelligent electronic device. The intelligent electronic device may further include computer code enabling the intelligent electronic device to adapt a monitoring of a functional element of a power grid and/or adapt a control of a functional element of a power grid based on the information sent to and/or received from other intelligent electronic devices.

According to embodiments described herein, a computer-readable storage medium including instructions which, when executed by a computer, cause the computer to carry out a method according to embodiments described herein is provided. Instructions may also be understood as computer code which when executed causes the intelligent electronic device to carry out a method according to embodiments herein.

The following reference numbers are indicated in the accompanying drawings.

110 First intelligent electronic device
120 Second intelligent electronic device
130 Base station
140 Power transmission line
150 First substation
160 Second substation
210 Intelligent electronic device
220 Wireless communication module
230 Microprocessor
240 Program memory
250 Computer code
310, 410, 510 monitoring at least two QoS parameters of the wireless communication
320, 420, 520 controlling the operation of the intelligent electronic device based on the at least two QoS parameters
430 operating the intelligent electronic device in a fail-safe mode
530 restoring the intelligent electronic device to normal operation mode While the foregoing is directed to embodiments, other and further embodiments may be devised without departing from the basic scope, and the scope is determined by the claims that follow.

The invention claimed is:

1. A method of operating an intelligent electronic device that is in a wireless communication with a base station of a wireless communication system, the method comprising:
   monitoring at least two QoS parameters of the wireless communication,
   monitoring at least one status variable of the base station received from the base station, wherein the at least one status variable includes a power status of the base station indicating the base station is on normal electric power or an uninterruptable power supply,
   controlling the operation of the intelligent electronic device based on the at least two QoS parameters and based on the at least one status variable,
   wherein the intelligent electronic device comprises a wireless communication module,
   wherein the wireless communication is carried out between the wireless communication module and the base station of the wireless communication system, and
   wherein the at least two QoS parameters are determined at least in part in the wireless communication module and are transferred to a control module of the intelligent electronic device via an interface.

2. The method of claim 1, wherein controlling the operation of the intelligent electronic device based on the at least two QoS parameters comprises at least one of the following:
   modifying a protection method employed in the intelligent electronic device,
   modifying a communication method between the intelligent electronic device and a base station, and
   modifying a control method in the intelligent electronic device.

3. The method of claim 2, wherein monitoring the at least two parameters of the wireless communication comprises monitoring at least two of the following:
   a received signal strength indicator,
   a latency parameter,
   a packet loss rate parameter, and
   a network load parameter.

4. The method of claim 2, further comprising, receiving, via the wireless communication module, at least one QoS parameter determined in the base station from the base station.

5. The method of claim 2, wherein the at least one status variable includes:
   a health status of the base station, and/or
   a health status of at least one internal system of the base station.

6. The method of claim 1, wherein monitoring the at least two parameters of the wireless communication comprises monitoring at least two of the following:
   a received signal strength indicator,
   a latency parameter,
   a packet loss rate parameter, and
   a network load parameter.

7. The method of claim 1, further comprising, receiving, via the wireless communication module, at least one QoS parameter determined in the base station from the base station.

8. The method of claim 1, wherein the at least one status variable includes:
   a health status of the base station, and/or
   a health status of at least one internal system of the base station.

9. The method of claim 1, further comprising at least one of the following:
   determining a state of communication outage based on the at least two QoS parameters, and
   operating the intelligent electronic device in a fail-safe mode.

10. The method of claim 9, further comprising
    monitoring the at least two QoS parameters during the state of communication outage,
    determining that the state of communication outage has ended based on the at least two QoS parameters, and
    restoring the intelligent electronic device to normal operation mode, wherein restoring the intelligent electronic device to normal operation mode comprises at least one of the following:
    restoring the intelligent electronic device to a normal-power mode from the low-power mode,
    sending, to the base station, information that was to be sent to the base station and that was stored locally in the intelligent electronic device during the communication outage,
    resuming ongoing software updates,
    returning the intelligent electronic device to a state of allowing software updates,
    informing a supervisory control and data acquisition (SCADA) system of a return of the intelligent electronic device to a normal operation mode, and
    allowing a resumption of a normal level of automatic control of the intelligent electronic device.

11. The method of claim 9, wherein operating the intelligent electronic device in the fail-safe mode comprises at least one of the following:

operating the intelligent electronic device in low-power mode, decreasing an amount of information for sending to the base station, storing information to be sent to the base station locally in the intelligent electronic device, rolling back ongoing software updates, denying new software updates, alerting a supervisory control and data acquisition (SCADA) system of a change of the intelligent electronic device to the fail-safe mode, and allowing a local control or an increased level of local control of the intelligent electronic device.

12. The method of claim 1, wherein the intelligent electronic device is configured to monitor a functional element of a power grid, control a functional element of a power grid, or monitor and control a functional element of a power grid.

13. The method of claim 1, wherein the intelligent electronic device has a function of at least one of the following: a protective relaying device, a tap changer controller, a circuit breaker controller, a capacitor bank switch, a recloser controller, and a voltage regulator.

14. The method of claim 1, wherein the intelligent electronic device is configured to communicate with other intelligent electronic devices.

15. An intelligent electronic device configured for a wireless communication with a base station of a wireless communication system, the intelligent electronic device comprising:

a microprocessor and a program memory comprising computer code enabling the intelligent electronic device to perform a method comprising:

monitoring at least two QoS parameters of the wireless communication, monitoring at least one status variable of the base station received from the base station, wherein the at least one status variable includes a power status of the base station indicating the base station is on normal electric power or an uninterruptable power supply, controlling the operation of the intelligent electronic device based on the at least two QoS parameters and based on the at least one status variable, wherein the intelligent electronic device comprises a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device via an interface.

16. The intelligent electronic device of claim 15, which further comprising a wireless communication module for carrying out the wireless communication with the base station of the wireless communication system.

17. The intelligent electronic device of claim 15, further comprising a control module, wherein the wireless communication module is configured for transferring the at least two QoS parameters via an interface to the control module.

18. A program for operating an intelligent electronic device, the program stored on a non-transitory computer-readable storage medium and comprising instructions which, when executed by a processor, cause the intelligent electronic device to perform a method comprising:

monitoring at least two QoS parameters of the wireless communication, monitoring at least one status variable of the base station received from the base station, wherein the at least one status variable includes a power status of the base station indicating the base station is on normal electric power or an uninterruptable power supply, controlling the operation of the intelligent electronic device based on the at least two QoS parameters and based on the at least one status variable, wherein the intelligent electronic device comprises a wireless communication module, wherein the wireless communication is carried out between the wireless communication module and the base station of the wireless communication system, and wherein the at least two QoS parameters are determined at least in part in the wireless communication module and are transferred to a control module of the intelligent electronic device via an interface.

* * * * *